(12) United States Patent
Namba

(10) Patent No.: US 7,451,139 B2
(45) Date of Patent: Nov. 11, 2008

(54) DOCUMENT SIMILARITY CALCULATION APPARATUS, CLUSTERING APPARATUS, AND DOCUMENT EXTRACTION APPARATUS

(75) Inventor: Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 10/281,318

(22) Filed: Oct. 28, 2002

(65) Prior Publication Data

US 2003/0172058 A1 Sep. 11, 2003

(30) Foreign Application Priority Data

Mar. 7, 2002 (JP) .............................. 2002-062239

(51) Int. Cl.
*G06F 17/30* (2006.01)
(52) U.S. Cl. ............................. 707/5; 707/6; 707/104.1; 707/1
(58) Field of Classification Search .................... 707/1, 707/500.1, 3, 5; 382/225
See application file for complete search history.

(56) References Cited

U.S. PATENT DOCUMENTS

| | | | | |
|---|---|---|---|---|
| 6,137,911 | A * | 10/2000 | Zhilyaev | 382/225 |
| 6,289,342 | B1 | 9/2001 | Lawrence et al. | |
| 6,640,227 | B1 * | 10/2003 | Andreev | 707/6 |
| 2002/0065845 | A1 * | 5/2002 | Naito et al. | 707/500.1 |
| 2002/0156760 | A1 * | 10/2002 | Lawrence et al. | 707/1 |
| 2002/0184267 | A1 * | 12/2002 | Nakao | 707/515 |

FOREIGN PATENT DOCUMENTS

| | | |
|---|---|---|
| JP | 2000-250925 | 9/2000 |
| JP | 2001-067364 | 3/2001 |
| JP | 2002-041573 | 2/2002 |

OTHER PUBLICATIONS

Maarek, Fagin, Gen-Shau and Pelleg, "Ephemeral Document Clustering for Web Applications", IBM Research Report, RJ 10186, Apr. 2000.*
Japanese Office Action for corresponding Japanese Patent Application No. 2002-062239 dated Sep. 25, 2007.

* cited by examiner

*Primary Examiner*—Cam Y Truong
*Assistant Examiner*—Dennis Myint
(74) *Attorney, Agent, or Firm*—Staas & Halsey LLP

(57) ABSTRACT

An input section inputs a document set. A normalization section calculates a similarity as a relative value between documents, with respect to combinations of a plurality of documents, in the document set. The normalization section employs the tf·idf method. In tf·idf method, a document vector and a significance of a word included in the document is used to perform normalization to convert each similarity to an absolute value.

7 Claims, 19 Drawing Sheets

FIG.8

| | |
|---|---|
| Q1 | HELLO. I CANNOT CONNECT FROM YESTERDAY. I THINK I DIDN'T CHANGE SETTING. |
| Q2 | I CANNOT CONNECT. HOW CAN I SOLVE THIS PROBLEM? |
| Q3 | I CANNOT CONNECT, SINCE I CHANGED TO ISDN. HOW CAN I SOLVE THIS PROBLEM? |
| Q4 | I CANNOT CONNECT AT ALL TODAY. I THINK SOMETHING IS WRONG. |
| Q5 | PLEASE TELL ME HOW TO CONNECT TO ISDN. I CANNOT CONNECT. I TRIED VARIOUS WAYS, BUT COULDN'T. |
| Q6 | I'D LIKE TO CHANGE CHARGING COURSE. PLEASE TELL ME HOW I CAN DO THAT. |
| | .. |
| QM | I CANNOT CONNECT. PLEASE TELL ME HOW TO DO IT. |
| QM+1 | |
| | .. |
| QN | I'D LIKE TO CANCEL. CAN I CANCEL FROM WEB SITE? |
| | I TRIED IT, BUT IT DIDN'T WORK. IS SOMETHING WRONG? |
| QN+1 | I'D LIKE TO CANCEL FROM WEB SITE. I THINK IT IS WRITTEN IN MANUAL THAT IT IS POSSIBLE. |
| QN+2 | I'D LIKE TO CANCEL FROM WEB SITE. |

(END OF SENTENCE RULE)

"IT IS NOT POSSIBLE TO ..."    ADD DISABLED STATE
"?"                            ADD QUESTIONING STATE
"IS IT ...?"                   ADD QUESTIONING STATE
"PLEASE TELL ME" & "I WANT TO ..."    ADD DESIRED STATE (STATUS COMBINATION RULE)

DISABLED STATE AND QUESTIONING STATE IN DOCUMENT → DELETE QUESTIONING STATE
DESIRED STATE WITH SMALL AMOUNT OF INFORMATION    → DELETE DESIRED STATE

FIG.10

Q1   HELLO. <DISABLED> I CANNOT CONNECT FROM YESTERDAY. </DISABLED> I THINK I DIDN'T CHANGE SETTING.
Q2   <DISABLED> I CANNOT CONNECT. </DISABLED> <QUESTION> HOW CAN I SOLVE THIS PROBLEM? </QUESTION>
Q3   <DISABLED> I CANNOT CONNECT, SINCE I CHANGED TO ISDN. </DISABLED>
     <QUESTION> HOW CAN I SOLVE THIS PROBLEM? </QUESTION>
Q4   <DISABLED> I CANNOT CONNECT AT ALL TODAY. </DISABLED>  I THINK SOMETHING IS WRONG.
Q5   <DESIRE> PLEASE TELL ME HOW TO CONNECT TO ISDN. </DESIRE>
     I CANNOT CONNECT.  I TRIED VARIOUS WAYS, BUT COULDN'T.
Q6   <DESIRE> I'D LIKE TO CHANGE CHARGING COURSE. </DESIRE>
     <DESIRE> PLEASE TELL ME HOW I CAN DO THAT. </DESIRE>
         :
         :
QM   <DISABLED> I CANNOT CONNECT. </DISABLED>  <DESIRE> PLEASE TELL ME HOW TO DO IT. </DESIRE>
QM+1 <DISABLED> I CANNOT CONNECT WELL. </DISABLED> <DESIRE> PLEASE TELL ME SETTING METHOD. </DESIRE>
         :
         :
QN   <QUESTION> I'D LIKE TO CANCEL.  CAN I CANCEL FROM WEB SITE? </QUESTION>
     I TRIED IT, BUT IT DIDN'T WORK.  IS SOMETHING WRONG?
QN+1 <DESIRE> I'D LIKE TO CANCEL FROM WEB SITE. </DESIRE> I THINK IT IS WRITTEN IN MANUAL THAT IT IS POSSIBLE.
QN+2 <DESIRE> I'D LIKE TO CANCEL FROM WEB SITE. </DESIRE>

FIG.11

Q1 <DISABLED> I CANNOT CONNECT FROM YESTERDAY. </DISABLED>
Q2 <DISABLED> I CANNOT CONNECT. </DISABLED>
Q3 <DISABLED> I CANNOT CONNECT, SINCE I CHANGED TO ISDN. </DISABLED>
Q4 <DISABLED> I CANNOT CONNECT AT ALL TODAY. </DISABLED>
Q5 <DESIRE> PLEASE TELL ME HOW TO CONNECT TO ISDN. </DESIRE>
Q6 <DESIRE> I'D LIKE TO CHANGE CHARGING COURSE. </DESIRE>

. . .

QM <DISABLED> I CANNOT CONNECT. </DISABLED> <DESIRE> PLEASE TELL ME HOW TO DO IT. </DESIRE>
QM+1 <DISABLED> I CANNOT CONNECT WELL. </DISABLED> <DESIRE> PLEASE TELL ME SETTING METHOD. </DESIRE>

. . .

QN <QUESTION> I'D LIKE TO CANCEL. CAN I DO THAT FROM WEB SITE? </QUESTION>
QN+1 <DESIRE> I'D LIKE TO CANCEL FROM WEB SITE. </DESIRE>
QN+2 <DESIRE> I'D LIKE TO CANCEL FROM WEB SITE. </DESIRE>

DOCUMENT SET

NUMBER OF WORDS  14

| IN ORDER OF SIMILARITY | BEFORE NORMALIZATION | AFTER NORMALIZATION |
|---|---|---|
| 1 | 1.6 | 1.0 |
| 2 | 1.4 | 1.0 |
| 3 | 1.3 | 0.98 |

NUMBER OF WORDS  56

| IN ORDER OF SIMILARITY | BEFORE NORMALIZATION | AFTER NORMALIZATION |
|---|---|---|
| 1 | 4.8 | 1.0 |
| 2 | 2.6 | 1.0 |
| 3 | 2.4 | 0.92 |

FIG.14

| From | to | score |
|------|------|-------|
| Q1 | Q2 | 1.0 |
| Q1 | Q4 | 1.0 |
| Q1 | Q5 | 0.95 |
| Q1 | QM | 0.95 |
| Q1 | QM+1 | 0.93 |

| From | to | score |
|------|------|-------|
| Q2 | Q1 | 1.0 |
| Q2 | Q4 | 1.0 |
| Q2 | Q5 | 0.95 |
| Q2 | QM | 0.95 |
| Q2 | QM+1 | 0.93 |

| From | to | score |
|------|------|-------|
| Q3 | Q5 | 1.0 |

| From | to | score |
|------|------|-------|
| Q5 | Q3 | 1.0 |

| From | to | score |
|------|------|-------|
| Q4 | Q2 | 1.0 |
| Q4 | Q1 | 1.0 |
| Q4 | QM | .9 |
| Q4 | QM+1 | .9 |

| From | to | score |
|------|------|-------|
| QM | QM+1 | 1.0 |
| QM | Q2 | 1.0 |
| QM | Q1 | 0.95 |
| QM | Q4 | 0.90 |

| From | to | score |
|------|------|-------|
| Q6 | Q5 | 0.95 |

| From | to | score |
|------|------|-------|
| QN | QN+1 | 1.0 |
| QN | QN+2 | 1.0 |

| From | to | score |
|------|------|-------|
| QN+1 | QN | 1.0 |
| QN+1 | QN+2 | 1.0 |

| From | to | score |
|------|------|-------|
| QN+2 | QN | 1.0 |
| QN+2 | QN+1 | 1.0 |

FIG.16

1. SORT IN ORDER OF A LARGER NUMBER OF ELEMENTS.
2. WHEN NUMBER OF ELEMENTS IS SAME,
   SORT CLUSTERS SUCH THAT ONE HAVING A SMALLER AVERAGE SIMILARITY BETWEEN RESPECTIVE DOCUMENTS INCLUDED IN CLUSTER IS PLACED AT HIGHER RANK.
3. WHEN AVERAGE SIMILARITY IS SAME,
   SORT IN ORDER OF HAVING A SMALLER AMOUNT OF INFORMATION.
   (WHEN ELEMENT IN CLUSTER IS ONE)

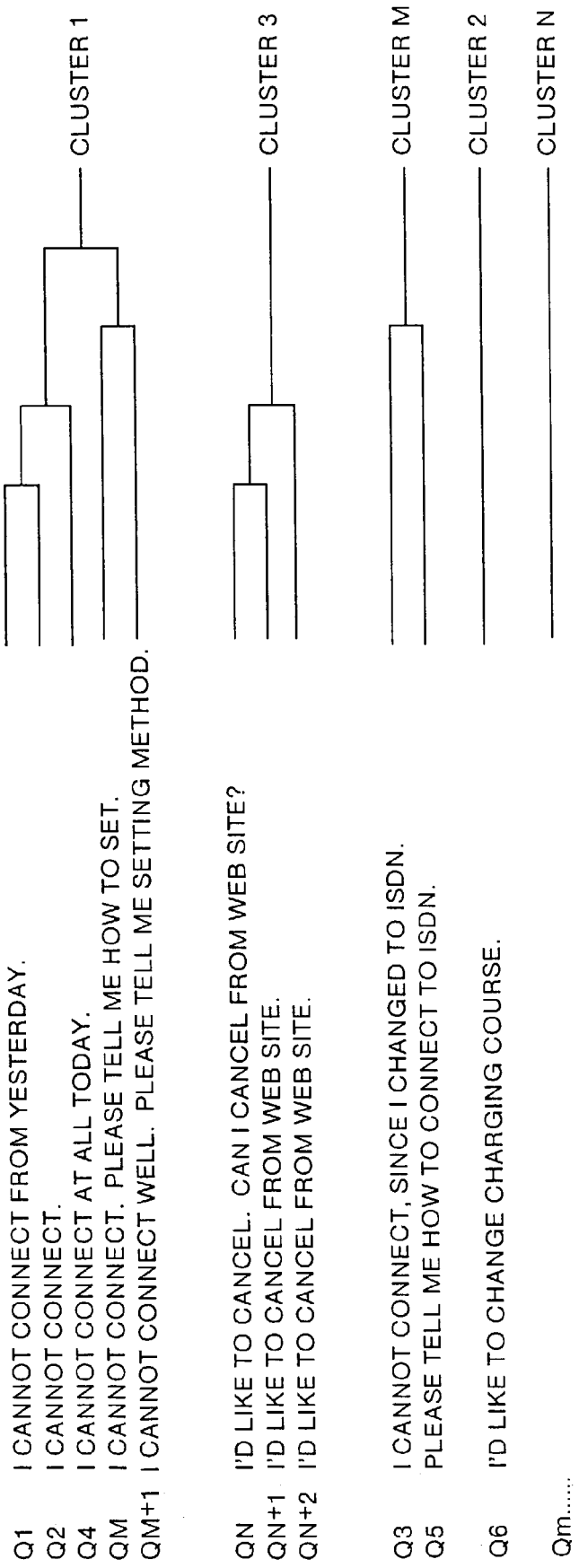

FIG.18A

SENTENCE DIVISION

- Q1S-1    I CANNOT CONNECT FROM YESTERDAY.
- Q2S-2    I CANNOT CONNECT.
- Q4S-3    I CANNOT CONNECT AT ALL TODAY.
- QMS-4    I CANNOT CONNECT.
- QMS-5    PLEASE TELL ME HOW TO SET.
- QM+1S-6  I CANNOT CONNECT WELL.
- QM+1S-7  PLEASE TELL ME SETTING METHOD

FIG.18B

ONE WHICH IS DEEPEST IN TREE STRUCTURE OF CLUSTERS AND HAS SMALLEST AMOUNT OF INFORMATION

CLUSTERING, CLUSTER SORT

- Q2S-2    I CANNOT CONNECT.
- QMS-4    I CANNOT CONNECT.
- QM+1S-6  I CANNOT CONNECT WELL.
- Q4S-3    I CANNOT CONNECT AT ALL TODAY.
- Q1S-1    I CANNOT CONNECT FROM YESTERDAY.
- QMS-5    PLEASE TELL ME HOW TO SET.
- QM+1S-7  PLEASE TELL ME SETTING METHOD.

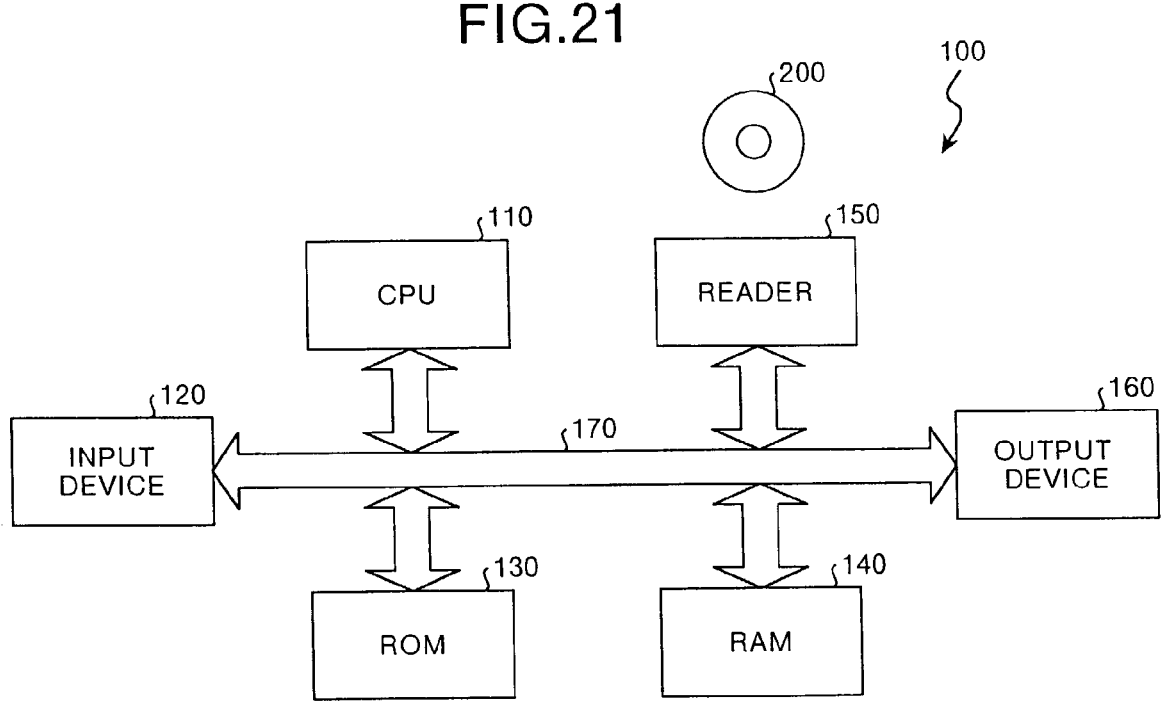

FIG.22

DOCUMENT 1   I CANNOT CONNECT.
DOCUMENT 2   CONNECTION IS DISABLED.
DOCUMENT 3   ERROR MESSAGE APPEARED IN SETTING OF TELEPHONE NUMBER OF ISDN, AND I CANNOT CONNECT.
DOCUMENT 4   I'D LIKE TO ASK YOU. IT SEEMS THAT SETTING OF ISDN OF N COMMUNICATION COMPANY IS WRONG, AND I CANNOT CONNECT TO ISDN.
. . .

DOCUMENT SIMILARITY CALCULATION APPARATUS, CLUSTERING APPARATUS, AND DOCUMENT EXTRACTION APPARATUS

BACKGROUND OF THE INVENTION

1) Field of the Invention

The present invention relates to a technology for efficiently extracting queries which appear frequently from a large number of queries, in a support center or the like where lots of queries from users are collected.

2) Description of the Related Art

Heretofore, in the search relating to question answering in a call center or the like, it is important to efficiently reuse answers in the past. For example, with regard to frequently asked questions, by presenting a question which is frequently asked and an answer thereto to users as FAQ (Frequently Asked Question), users can solve the problem by themselves.

By preparing such FAQs beforehand, it is possible for the call center or the like to eliminate the question answering work by an operator, thereby enabling reduction in the operation cost.

In the conventional method, there are required manual operations for manually coordinating the FAQs and selecting an FAQ that is considered to appear frequently, based on the correspondence by mails or phone calls to the call center.

As a method for automating FAQ preparation, there is recently used a method of clustering documents having a high similarity, by calculating the similarity between documents (queries), using a criteria referred to as a Cosine measure. Clustering is a technique for extracting candidates of frequently appearing question examples from a large number of question answering logs in a practical period of time.

An example of determining the similarity in a document set (document 1 to document 4) shown in FIG. 22 will be explained below. Documents 1 to 4 are question examples from users sent to a call center of a communication service system.

At first, with the Cosine measure, a document is regarded as a vector, and a value obtained by calculating the inner product thereof is designated as a similarity between documents. In other words, in the document set shown in FIG. 22, if it is assumed that a vector of each document is formed of a word of the underlined part, the similarity between documents (inner product value) is calculated as described below. As the inner product value increases, the distance between documents becomes shorter, and the similarity increases.

similarity between document 1 and document $1=1/(\sqrt{1}*\sqrt{1})=1$ similarity between document 3 and document $3=6/(\sqrt{1+1+1+1+1+1}*\sqrt{1+1+1+1+1+1})=1$ similarity between document 1 and document $3=1/(\sqrt{1}*\sqrt{1+1+1+1+1+1})=1/\sqrt{6}=5/\sqrt{30}$ similarity between document 3 and document $4=3/(\sqrt{1+1+1+1+1+1}*\sqrt{1+1+1+1+1+1})=3/\sqrt{30}$ As described above, heretofore, the similarity ($5/\sqrt{30}$) between document 1 and document 3 shown in FIG. 22 is calculated to be higher than the similarity ($3/\sqrt{30}$) between document 3 and document 4, but this calculation result is contrary to the intuition. That is, intuitively, it is felt that the similarity between document 3 and document 4 is higher than the similarity between document 1 and document 3.

With the Cosine measure, when the size of a document, being an object of similarity calculation, is hardly changed, it is possible to calculate the similarity with high accuracy. For example, as a document having few change, there can be mentioned a summary in a paper.

On the other hand, as the above-described queries, when a change in the document size is large, and frequency of appearance of a word is mostly 1, there is a disadvantage in the Cosine measure that the similarity of a document having a large document size becomes unreasonably low.

Therefore, there is a problem in the conventional method that even if the similarity by the conventional Cosine measure is directly used to perform clustering, only a cluster of short documents unreasonably grows, and a cluster of long documents does not grow, and hence balanced clustering cannot be performed, and desirable results cannot be obtained.

In order to solve the above problem, in the conventional information search, a tf·idf method which obtains a similarity between documents is used, by designating a significance of a word as a weight. The idf is an abbreviation of inverse document frequency, which is obtained by taking an inverse number of a document including a word with respect to the whole document set, and expresses the amount of information which the word itself has. Here, if it is assumed that the total document number (not shown) of the document set shown in FIG. 22 is 1024, the number of documents which include "connect" is 512, the number of documents which include "ISDN" is 8, and the number of documents which include "set" is 256, then, the idf of "connect" becomes 1, the idf of "ISDN" becomes 7, and the idf of "set" becomes 2. In this example, vector size is not normalized by idf.

The results obtained by recalculating the above similarity by taking this idf into account are shown below.

similarity between document 1 and document $1=1/(\sqrt{1}*\sqrt{1})=1$ similarity between document 1 and document $3=1/(\sqrt{1}*\sqrt{1+1+1+1+1+1})1/\sqrt{6}=5/\sqrt{30}$ similarity between document 3 and document $4=1+7+2/(\sqrt{1+1+1+1+1}*\sqrt{1+1+1+1+1+1})=10/\sqrt{30}$ As is seen from the above calculation results, the similarity between document 3 and document 4 ($10/\sqrt{30}$) becomes higher than the similarity between document 1 and document 3 ($5/\sqrt{30}$), and coincides with the intuition. However, in this method, since the calculation result is a relative value, there is a disadvantage in that a similarity between different documents cannot be directly compared, even if we normalize text size by idf.

SUMMARY OF THE INVENTION

It is an object of this invention to provide a document similarity calculation apparatus, a clustering apparatus and a document extraction apparatus, that can calculate the similarity of documents as an absolute value and can perform clustering and document extraction efficiently, with high accuracy and without relying on the document size.

The document similarity calculation apparatus according to one aspect of the present invention comprises a similarity calculation unit which respectively calculates a similarity as a relative value between documents, with respect to combinations of a plurality of documents, using a document vector and a significance of a word included in the document; and a conversion unit which converts each similarity calculated by the similarity calculation unit to an absolute value by normalization.

The document similarity calculation method according to another aspect of the present invention comprises a similarity calculation step of respectively calculating a similarity as a relative value between documents, with respect to combinations of a plurality of documents, using a document vector and a significance of a word included in the document; and a conversion step of converting each similarity calculated at the similarity calculation step to an absolute value by normalization.

The clustering apparatus according to still another aspect of the present invention comprises a similarity calculation unit which respectively calculates a similarity as a relative value between documents, with respect to combinations of documents, using a document vector and a significance of a word included in the document; a conversion unit which converts each similarity calculated by the similarity calculation unit to an absolute value by normalization; and a clustering unit which executes clustering of documents, based on the similarity of the absolute value.

The clustering method according to still another aspect of the present invention comprises a similarity calculation step of respectively calculating a similarity as a relative value between documents, with respect to combinations of a plurality of documents, using a document vector and a significance of a word included in the document; a conversion step of converting each similarity calculated at the similarity calculation step to an absolute value by normalization; and a clustering step of executing clustering of a plurality of documents, based on the similarity of the absolute value.

The document extraction apparatus according to still another aspect of the present invention comprises a similarity calculation unit which respectively calculates a similarity as a relative value between documents, with respect to combinations of a plurality of documents, using a document vector and a significance of a word included in the document; a conversion unit which converts each similarity calculated by the similarity calculation unit to an absolute value by normalization; a clustering unit which performs clustering of a plurality of documents, based on the similarity of the absolute value; a cluster sort unit which sorts the results of the clustering, using the number of documents constituting each cluster as a key; a representative document selection unit which selects a representative document from each cluster, with respect to the sorted results; and an output unit which outputs the representative documents in order corresponding to the sorted results.

The document extraction method according to still another aspect of the present invention comprises a similarity calculation step of respectively calculating a similarity as a relative value between documents, with respect to combinations of a plurality of documents, using a document vector and a significance of a word included in the document; a conversion step of converting each similarity calculated at the similarity calculation step to an absolute value by normalization; a clustering step of performing clustering of a plurality of documents, based on the similarity of an absolute value; a cluster sort step of sorting the results of clustering, using the number of documents constituting each cluster as a key; a representative document selection step of selecting a representative document from each cluster, with respect to the sorted results; and an output step of outputting the representative documents in order corresponding to the sorted results.

The computer programs according to still another aspect of the present invention realize the different units of different apparatuses according to the present invention on a computer.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 8 is a diagram which shows a document set 20 in the embodiment, FIG. 9 is a diagram which shows a role-allocating rule in the embodiment, FIG. 10 is a diagram which shows role allocating results in the embodiment, FIG. 11 is a diagram which shows role allocating results after a status combination rule has been applied in the embodiment, FIG. 14 is a diagram which shows normalized similarities in the embodiment, FIG. 16 is a diagram which shows sort conditions of clusters in the embodiment, FIG. 17 is a diagram which shows sorted results of clusters in the embodiment, FIG. 18A and FIG. 18B are diagrams which show document selection in the embodiment, FIG. 20 is a diagram which shows final output sentences in the embodiment, FIG. 21 is a block diagram which shows the configuration of a modification example in the embodiment, and FIG. 22 is a diagram which shows a document set.

DETAILED DESCRIPTIONS

Figure 1:
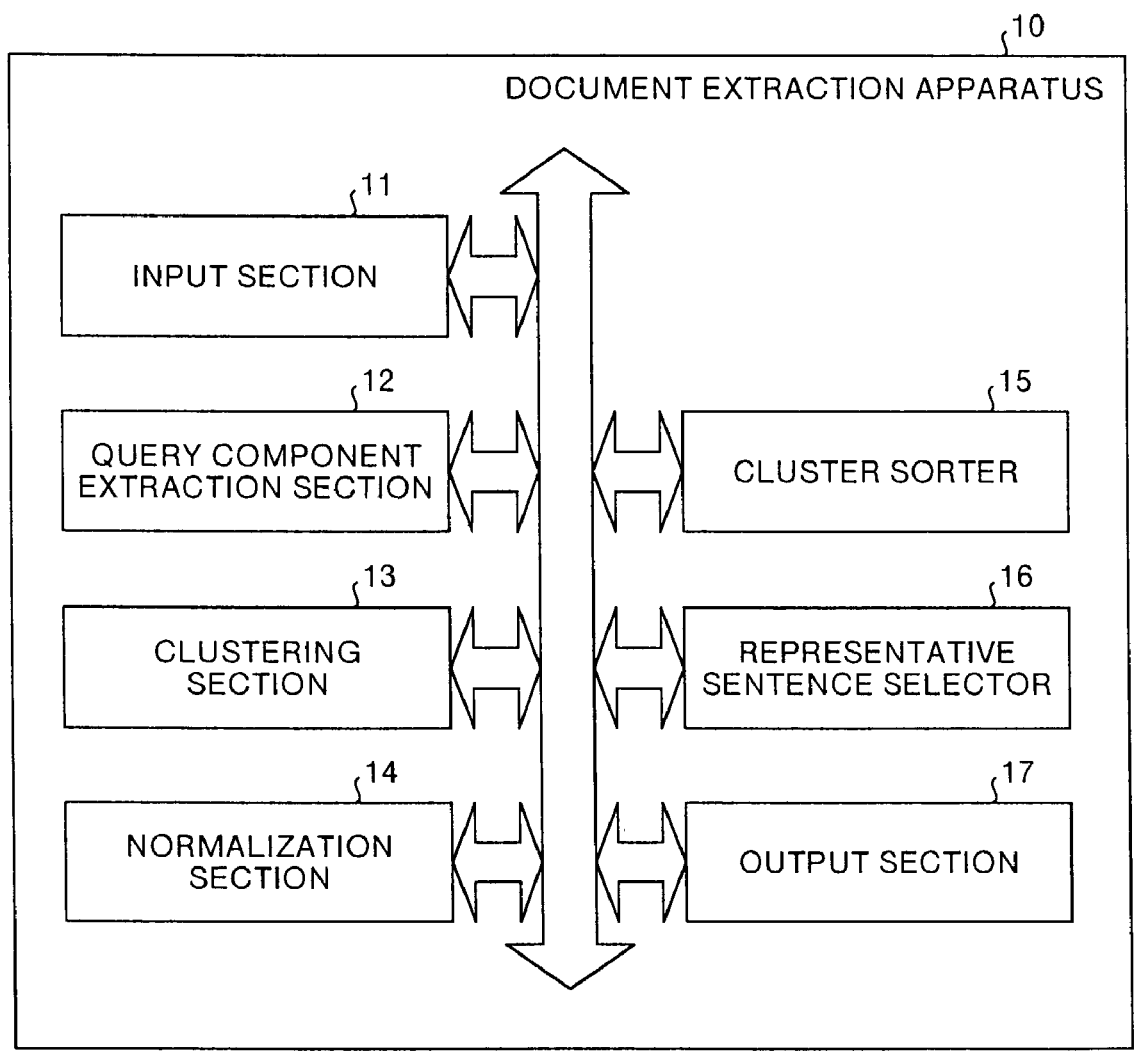
FIG. 1 is a block diagram which shows the configuration of one embodiment according to the present invention.

Embodiments of the document similarity calculation apparatus, the clustering apparatus, and the document extraction apparatus according to the present invention will now be explained in detail, with reference to the accompanying drawings. In the drawings, there is shown a document extraction apparatus 10 which is also applied to an FAQ creation apparatus in a call center or the like and efficiently extracts frequently asked queries constituting the FAQ from a large number of queries.

In the document extraction apparatus 10, an input section 11 inputs a document set 20 (see FIG. 8), being a set of queries asked to the call center. A query component extraction section 12 extracts a component from the queries of the document set 20.

As this component, there can be mentioned "It is not possible to . . . " (disabled state), "?" (questioning state), "Is it . . . ?" (questioning state), "Please tell me" and "I want to . . . " (desired state) or the like. A query component extraction section 12 allocates a role (the above-described disabled state, questioning state or desired state) to the component.

A clustering section 13 carries out clustering of the document set 20. A normalizing section 14 calculates a similarity between documents by the above-described tf·idf method, and performs normalization for making the similarity an absolute value. A cluster sorter 15 sorts the results clustered by the clustering section 13. A representative sentence selector 16 extracts a representative sentence representing each cluster. An output section 17 outputs the representative sentence as an extraction result, in order of the sorted results of the clusters.

Figure 2:
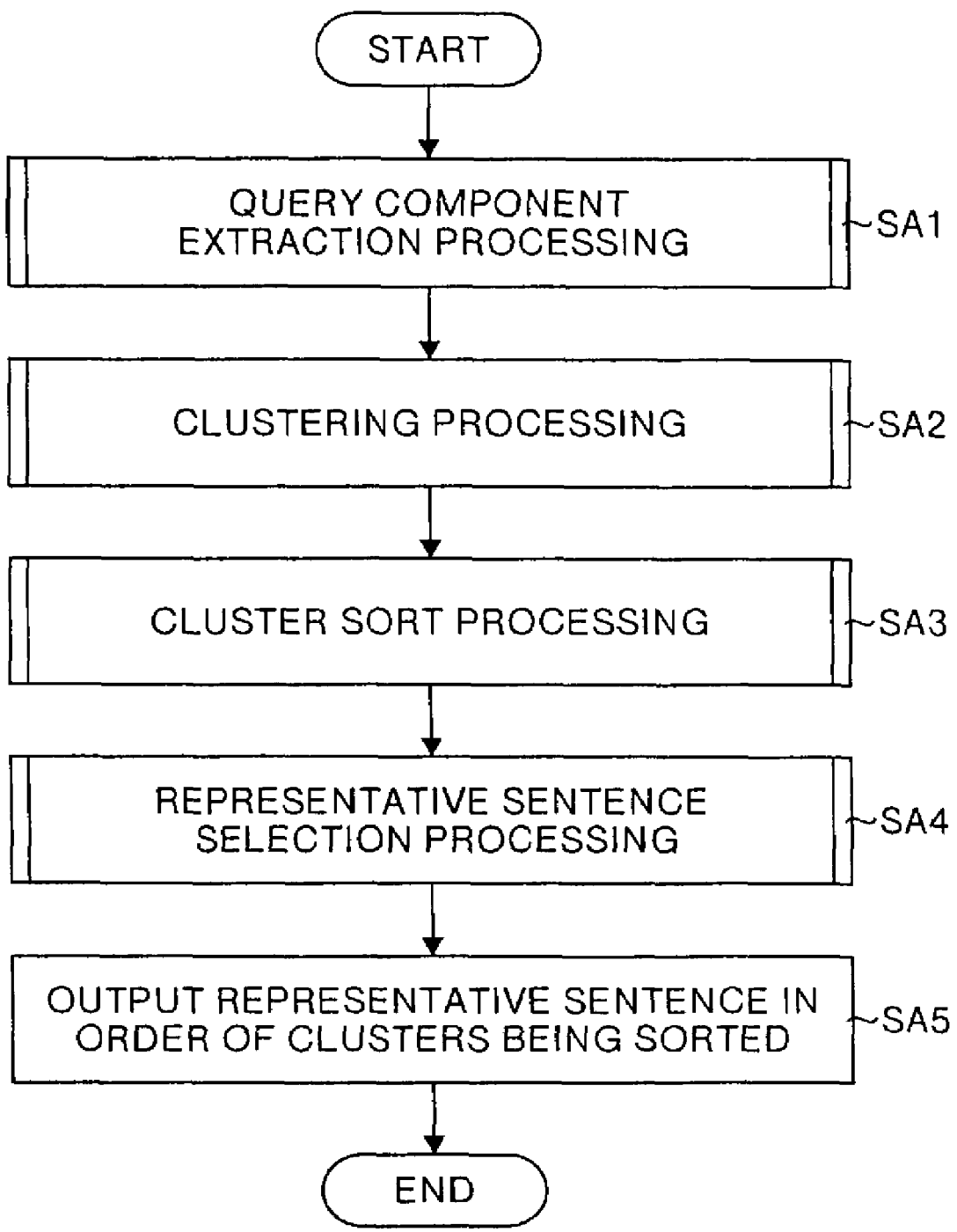
FIG. 2 is a flowchart which shows the operation in one embodiment.

The operation of this embodiment will be explained next, with reference to the flowcharts shown in FIG. 2 to FIG. 7, and drawings of FIG. 8 to FIG. 20. FIG. 2 is a flowchart which shows the operation in one embodiment. At step SA1 shown in this figure, query component extraction processing is executed.

Figure 3:
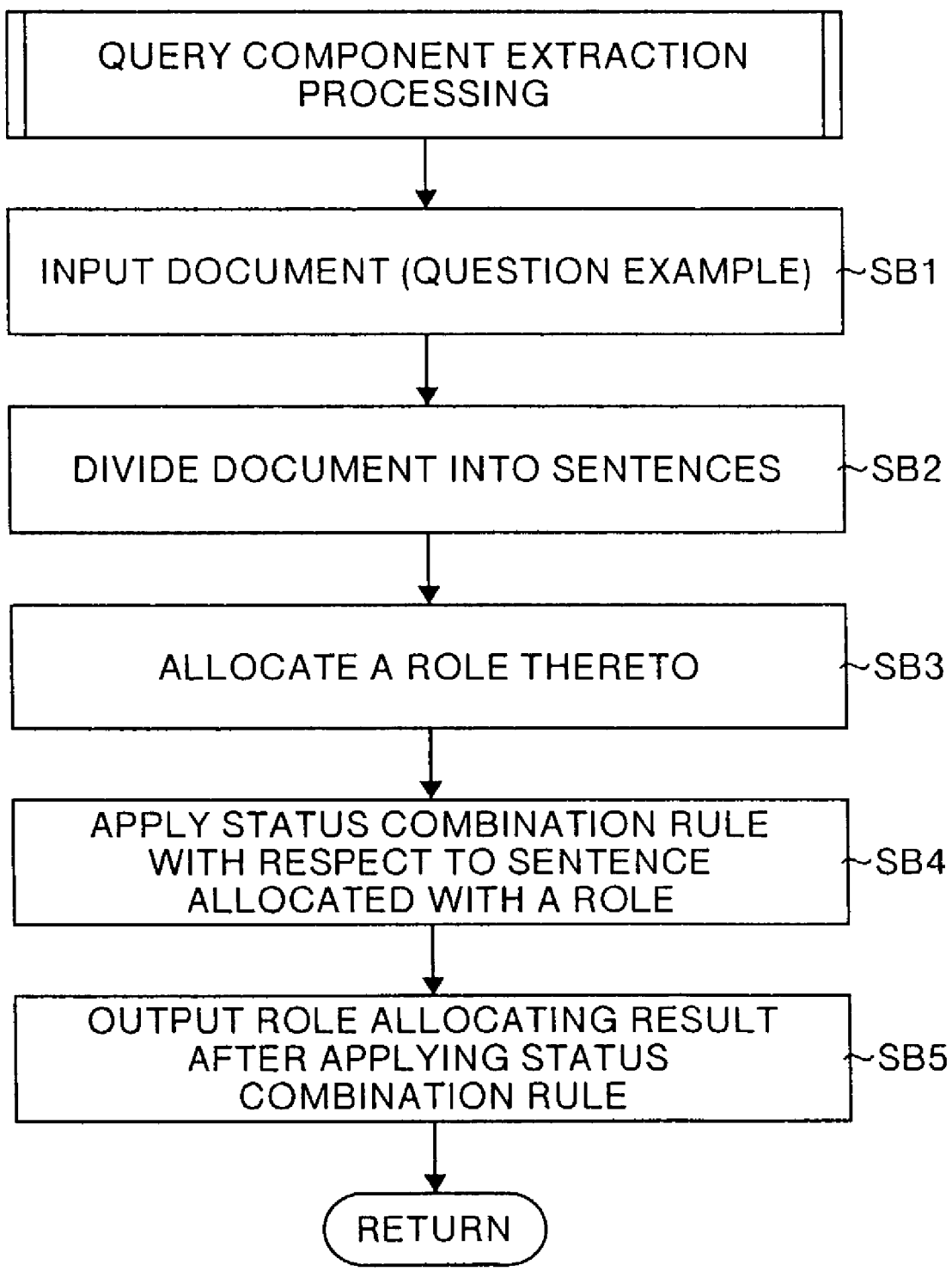
FIG. 3 is a flowchart which shows a query component extraction processing shown in FIG. 2.

Specifically, at step SB1 shown in FIG. 3, the input section 11 inputs the document set 20 shown in FIG. 8. At step SB2, the query component extraction section 12 divides each document (query document) of the document set 20, based on the end of sentence rule in a role-allocating rule shown in FIG. 9.

As the end of sentence rule, for example, there can be mentioned "It is not possible to . . . " (disabled state) "?" (questioning state), "Is it . . . ?" (questioning state) "Please tell me" (desired state) and "I want to . . . " (desired state). One including one of these end of sentence rules is divided as a sentence.

In the example of the document set 20 shown in FIG. 8, in Q1, a sentence "I cannot connect from yesterday" is divided. Division is carried out hereinafter in the same manner. At step SB3, the query component extraction section 12 allocates a role (disabled state, questioning state or desired state) to the sentence divided at step SB2, to obtain the role allocating results shown in FIG. 10.

In the role allocating results, in a sentence between <disabled> and </disabled>, a role of disabled state is allocated to the sentence therebetween. In a sentence between <question> and </question>, a role of questioning state is allocated to the sentence therebetween. Further, in a sentence between <desire> and </desire>, a role of desired state is allocated to the sentence therebetween.

At step SB4, the query component extraction section 12 applies the status combination rule shown in FIG. 9 with respect to the sentence allocated with the role. Specifically, in the role allocating results shown in FIG. 10, when a plurality of roles such as "disabled state" and "questioning state" are allocated to one document, a sentence corresponding to the "questioning state" is deleted as a redundant sentence, and a sentence corresponding to the "disabled state" is left.

When the amount of information of the sentence corresponding to the "desired state" is a thresholdor below, the relevant sentence is deleted. At step SB5, the query component extraction section 12 outputs the role allocating results after having applied the status combination rule as shown in FIG. 11, to thereby finish the query component extraction processing. In the above role allocating results (document set), a sentence is composed of only a sentence allocated with the role (main sentence).

Figures 12, 13A, 13B:
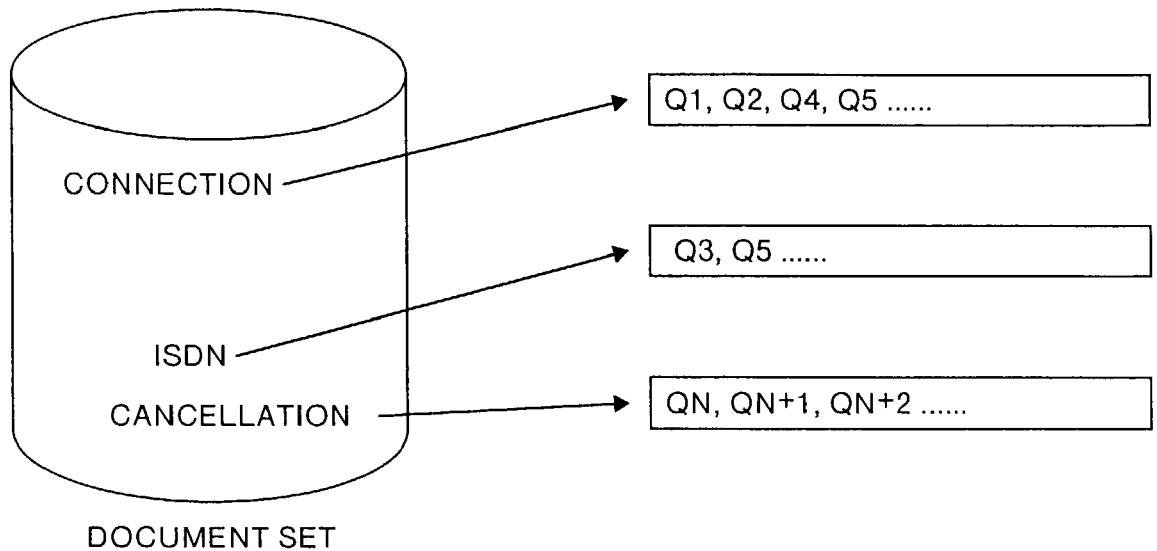
FIG. 12 is a diagram which shows indexing in the embodiment.
FIG. 13A and FIG. 13B are diagrams which show a normalization application example in the embodiment.

At step SA2 shown in FIG. 2, the clustering processing for dividing the document set into a plurality of clusters is executed. Specifically, at step SC1 shown in FIG. 4, the clustering section 13 creates an index for each document constituting the document set (see FIG. 11), being an object of clustering, as shown in FIG. 12, for the purpose of enabling a high-speed processing.

The indexing information is, for example, a document number allocated to the document, or an inverted file format in which data of frequency of appearance with respect to a word in a document is stored. When high-speed processing is not necessary, the processing at step SC1 is skipped.

At step SC2, the clustering section 13 selects one document (for example, query document of Q1) from the document set (see FIG. 11). At step SC3, the clustering section 13 calculates a similarity between the document selected at step SC2 and each of the other nonselected documents, and the normalization processing is executed for normalizing the similarity so that clustering is equally applied to the document, regardless of the document size.

Figure 4:
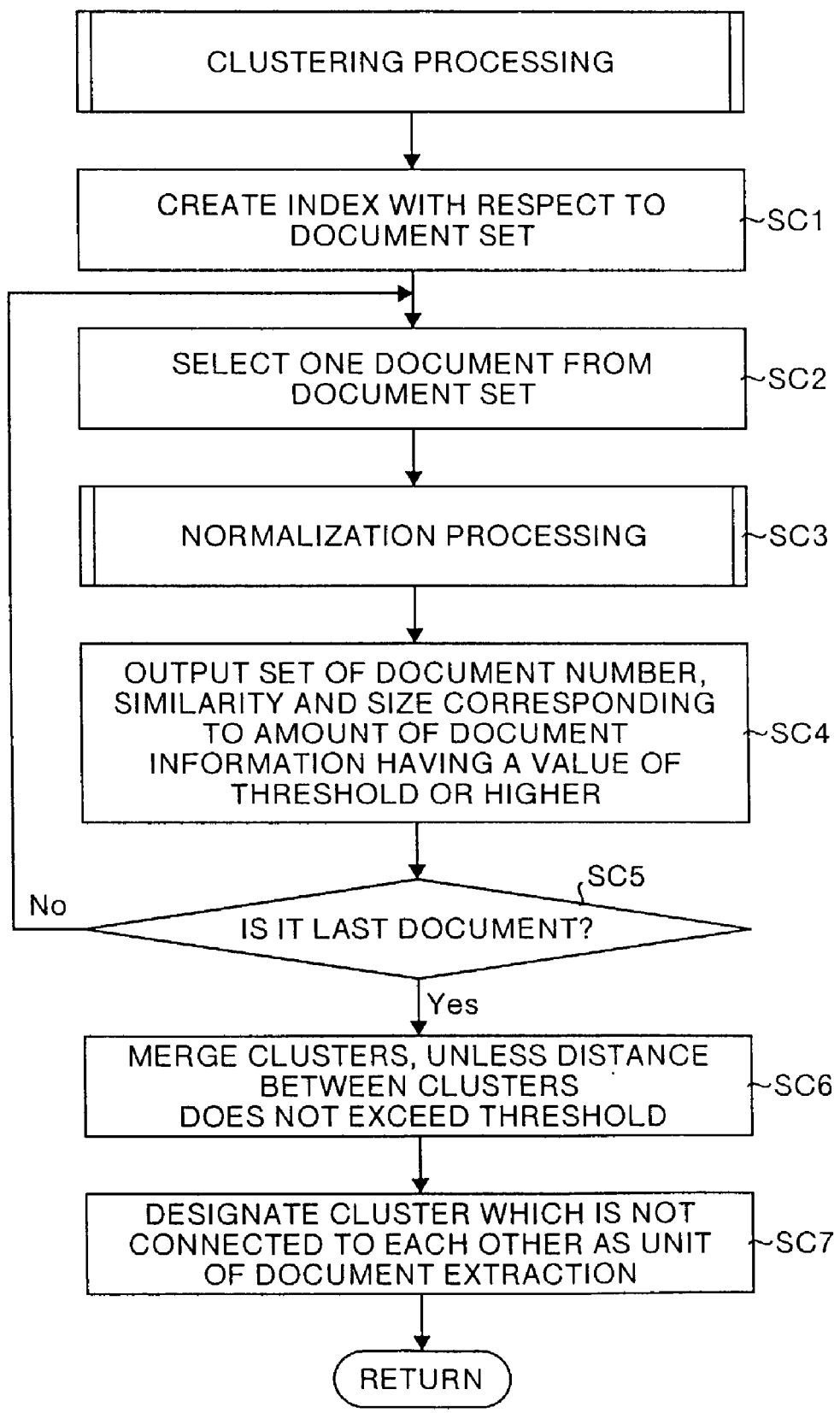
FIG. 4 is a flowchart which shows a clustering processing shown in FIG. 2.
Figure 5:
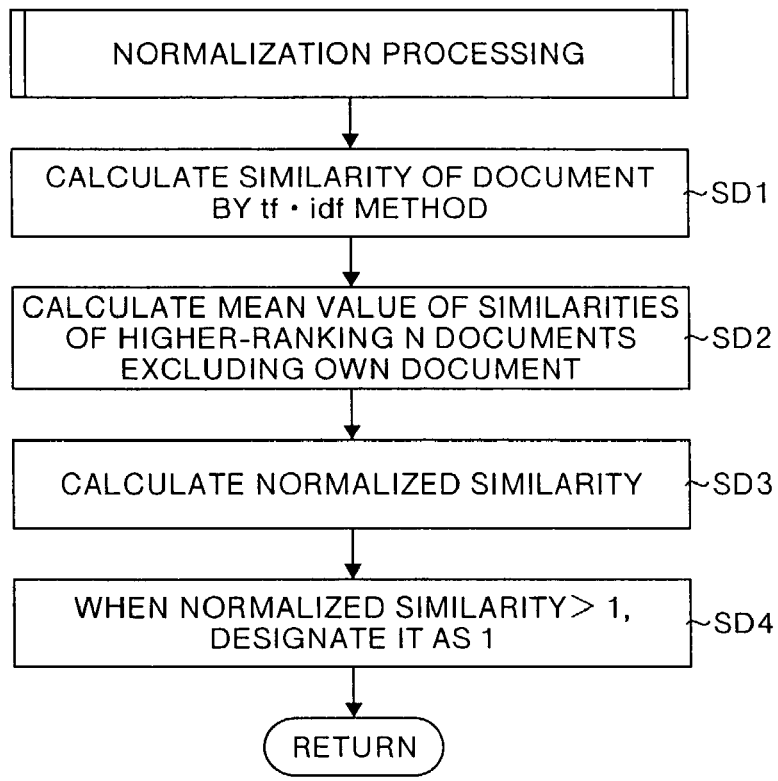
FIG. 5 is a flowchart which shows a normalization processing shown in FIG. 4.
Figure 6:
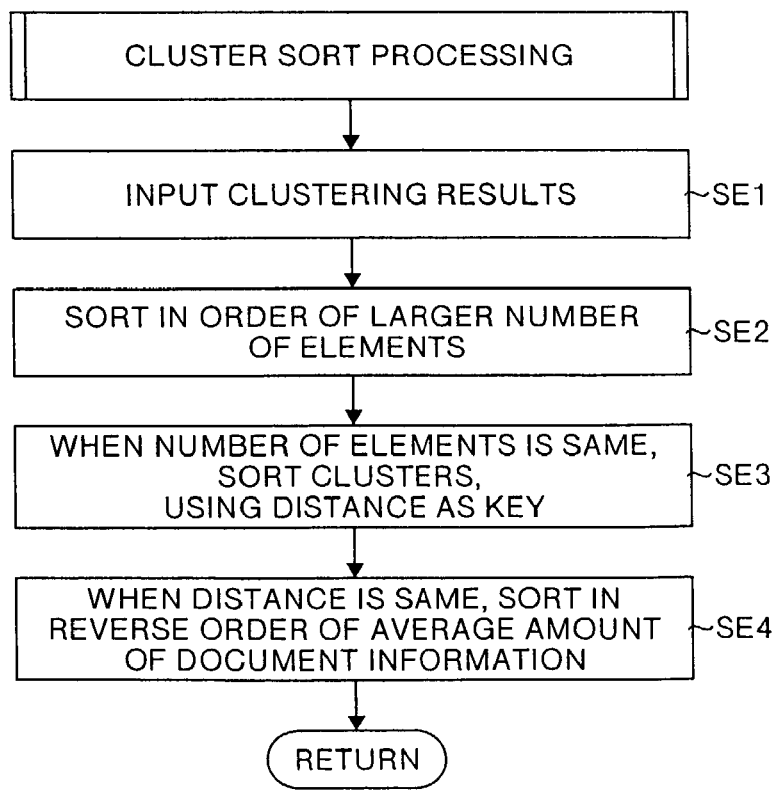
FIG. 6 is a flowchart which shows a cluster sort processing shown in FIG. 2.
Figure 7:
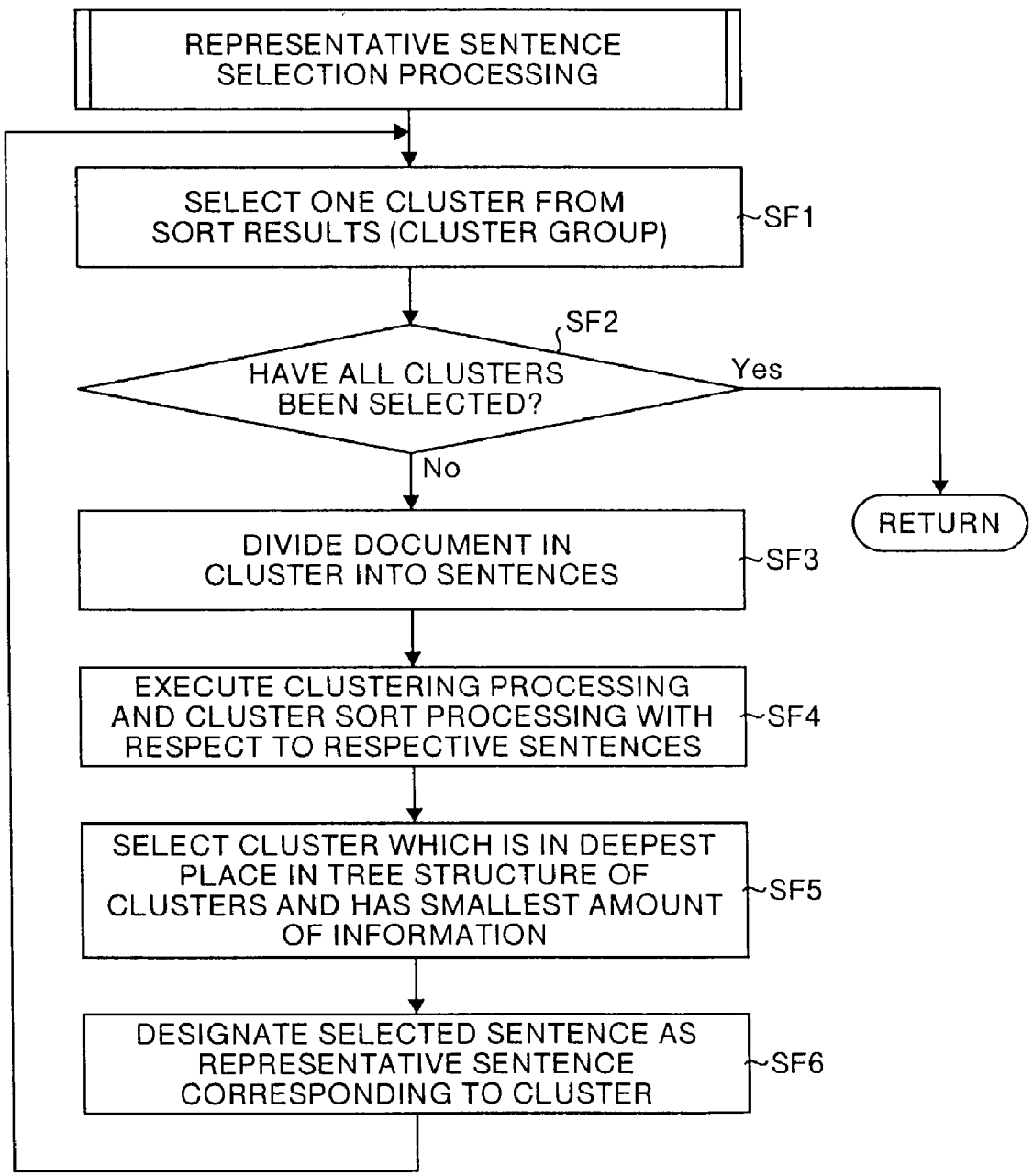
FIG. 7 is a flowchart which shows a representative sentence selection processing shown in FIG. 2.

Specifically, at step SD1 shown in FIG. 5, the normalization section 14 respectively calculates a similarity between the query document selected at step SC2 (see FIG. 4) and other documents to be searched, by the tf·idf method from the following equation (1):

$$\text{Similarity} = (\Sigma(\text{word included in query document}) \cdot (\text{weight of the word}))/(\text{vector size of query document}) \cdot (\text{vector size of document to be searched}) \quad (1),$$

where the weight of the word (idf)=log (total number of documents/number of documents including the word).

The normalization section 14 outputs the similarity calculation results in a format sorted in order of high similarity. At step SD2, the normalization section 14 calculates a mean value of similarities of higher-ranking N documents, excluding the relevant query document (itself). At step SD3, the normalization section 14 calculates normalized similarity from the following equation (2). This normalized similarity is one obtained by converting the similarity as a relative value by the tf·idf method to an absolute value.

$$\text{Normalized similarity} = \alpha \cdot (\text{similarity of target document/similarity of document of the first place}) + \beta \cdot (\text{similarity of target document/mean value of the similarities}) \quad (2),$$

where $\alpha$ and $\beta$ are coefficients.

If it is assumed that $\alpha$ is 0, the N documents is 1 and $\beta$ is 1, the equation (2) can be expressed by the following equation (3), $$\text{Normalized similarity} = (\text{similarity of target document/highest similarity in documents other than the relevant document}) \quad (3)$$

At step SD4, when the normalized similarity is 1 or larger, the normalization section 14 decides the normalized similarity to be 1, to thereby finish the normalization processing. FIGS. 13A and 13B are diagrams which show the application example of the normalization. In FIG. 13A, there are described similarities before and after the normalization of a document having a small document size, such that the number of words is 14, and the order thereof.

In FIG. 13B, there are described similarities before and after the normalization of a document having a large document size, such that the number of words is 54, and the order thereof. As seen from these diagrams, after the normalization, since the similarity is normalized to be 1 or below, regardless of the document size, it becomes possible to compare documents having a large document size and having a small document size at the same level.

At step SC4 shown in FIG. 4, the clustering section 13 outputs a set of the amount of document information of at least a threshold (for example, 0.9) (sum total of idf of a word included in the document), the document number, the similarity and the size. At step SC5, the clustering section 13 judges whether the last document has been selected from the document set (see FIG. 11), and in this case, it is assumed that the judgment result is "No". Thereafter, the processing at step SC2 to step SC4 is repetitively executed.

When the judgment result at step SC5 becomes "Yes", a normalized similarity (in FIG. 14, score) between a document (in FIG. 14, From) and a document (in FIG. 14, to) shown in FIG. 14 is obtained. At step SC6, the clustering section 13 uses the known ward method to perform clustering of documents according to the similarity. In this clustering, clusters are merged, unless the distance between clusters does not exceed the threshold.

Figure 15:
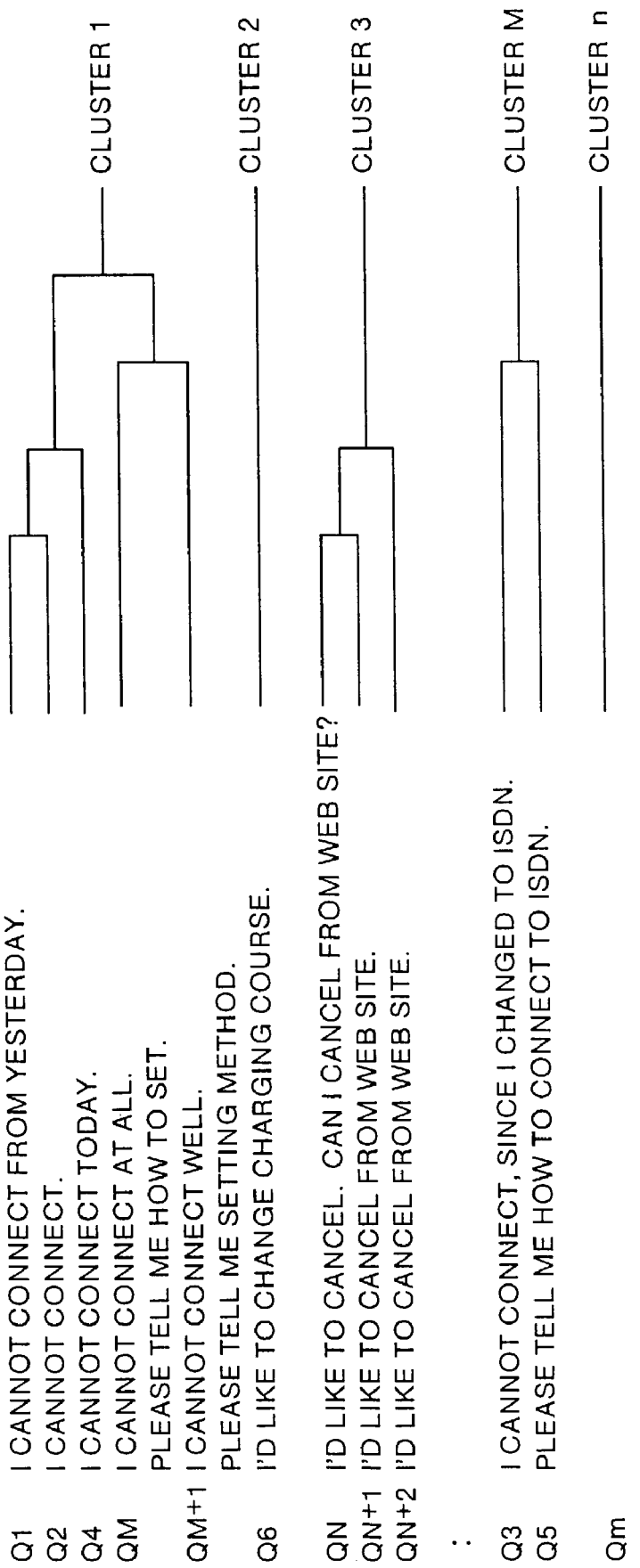
FIG. 15 is a diagram which shows clustering results in the embodiment.

At step SC7, the clustering section 13 finishes the clustering processing, designating a cluster which is not connected to each other as a unit of document extraction. FIG. 15 is a diagram which shows the clustering result. As seen from this figure, cluster 1 is constituted of documents Q1, Q2, Q4, QM and QM+1.

Cluster 2 is constituted of only document Q6. Cluster 3 is constituted of documents QN, QN+1 and QN+2. Hereafter, cluster n is constituted of only document Qm.

At step SA3 shown in FIG. 2, cluster sort processing is executed, based on the sort conditions shown in FIG. 16. Specifically, at step SE1 shown in FIG. 6, the cluster sorter 15 inputs the clustering results shown in FIG. 15. At step SE2, the cluster sorter 15 sorts the clusters in order of having a larger number of elements (documents) in the clustering results (see FIG. 15).

At step SE3, when clusters having the same number of elements exist, the cluster sorter 15 sorts the clusters such that one having a smaller average similarity (Euclidean distance) between respective documents included in the cluster is put at a higher rank.

At step SE4, when clusters having the same average similarity exist (when the element of the cluster is one) the cluster sorter 15 sorts the clusters in order, of having a smaller amount of information, and then finishes the cluster sort processing. FIG. 17 is a diagram which shows the sort results of clusters. In the sort results, clusters are sorted in order of cluster 1, cluster 3.

At step SA4 shown in FIG. 2, representative sentence selection processing is executed for selecting a representative sentence from each cluster in the sort results of clusters shown in FIG. 17. Specifically, at step SF1 shown in FIG. 7, the representative sentence selector 16 selects one cluster (for example, cluster 1) from the sort results (cluster group) shown in FIG. 17.

At step SF2, the representative sentence selector 16 judges whether all clusters have been selected from the sort results, and in this case, it is assumed that the judgment result is "No". At step SF3, the representative sentence selector 16 divides the document in cluster 1 selected at step SF1 into sentences as shown in FIG. 18A. That is, step SF3 is such processing that, when the document is constituted of a plurality of sentences, the sentences are divided into pieces.

The document QM shown in FIG. 17 is constituted of two sentences, that is, "I cannot connect" and "Please tell me the setting". In this case, as shown in FIG. 18A, the document QM is divided into sentence QMS-4 and sentence QMS-5. After the division of sentences, S-1 to S-7 are respectively added to the document numbers shown in FIG. 17.

At step SF4, after the above-described clustering processing (see FIG. 4) is executed with respect to each divided sentence (see FIG. 18A) by the clustering section 13, the cluster sort processing (see FIG. 6) is executed by the cluster sorter 15. FIG. 18B shows the execution results (cluster sort results) at step SF4.

At step SF5, the representative sentence selector 16 selects a cluster which is located in the deepest place in the tree structure of the cluster sort results shown in FIG. 18B and which has the smallest amount of information. In the example shown in this figure, the sentence Q2S-2, "I cannot connect" is selected. At step SF6, the representative sentence selector 16 designates the sentence selected at step SF5 as a representative sentence corresponding to the relevant cluster. Hereafter, at step SF1 and after, the next cluster is selected from the sort results (cluster group) shown in FIG. 17, and the above-described processing is executed.

Figure 19:
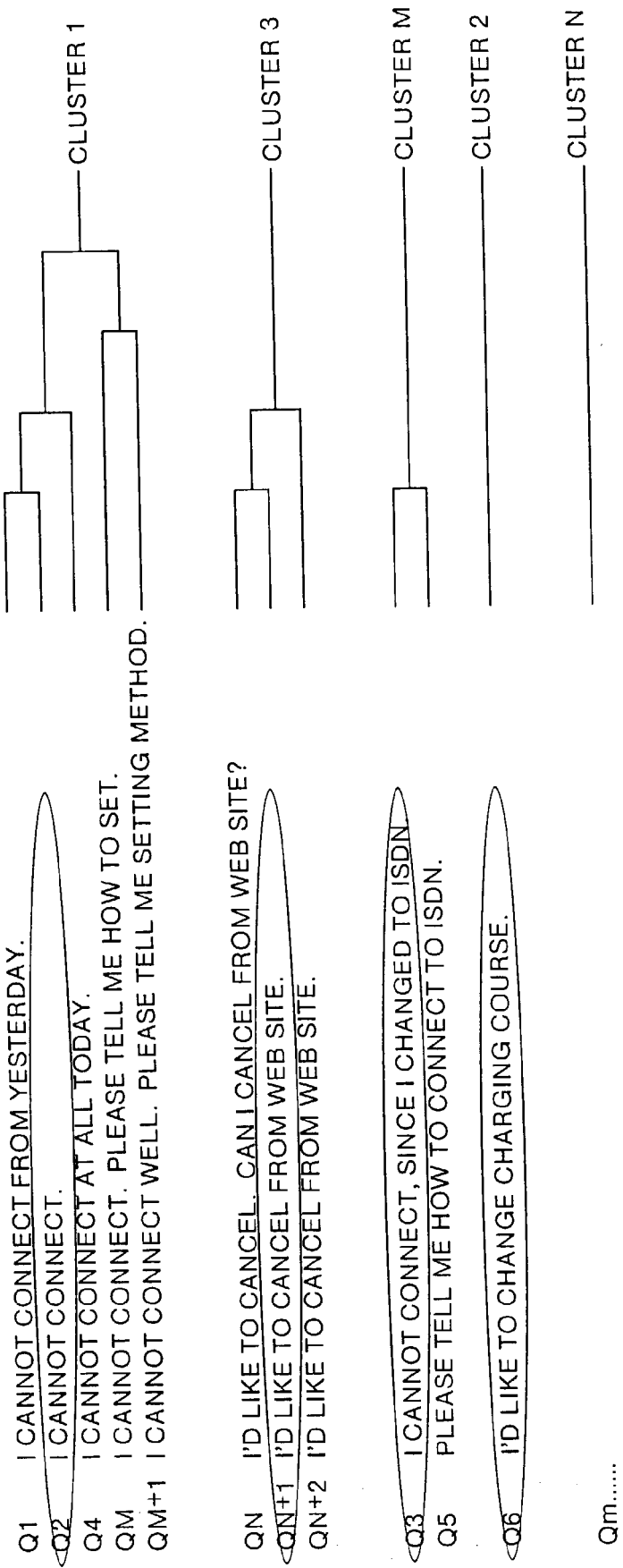
FIG. 19 is a diagram which shows representative sentence selection results in the embodiment.

When all clusters have been selected, the representative sentence selector 16 judges that the judgment result at step SF2 is "Yes", to finish the representative sentence selection processing. FIG. 19 is a diagram which shows the representative sentence selection results. In this figure, representative sentences in respective clusters (circled) are shown. The representative sentence in cluster 1 is "I cannot connect".

The representative sentence in cluster 3 is "I'd like to cancel from WEB site". The representative sentence in cluster M is "I cannot connect since I changed to ISDN". The representative sentence in cluster 2 is "I'd like to change the charging course".

At step SA5 shown in FIG. 2, the output section 17 outputs sets of cluster and representative sentence sorted from the representative sentence selection results shown in FIG. 19, as the final output sentences shown in FIG. 20. These final output sentences are queries in order of higher frequency of appearance. FAQ is prepared from these queries and the answers thereto.

As explained above, according to one embodiment, at step SD1 shown in FIG. 5, a similarity as a relative value between documents is respectively calculated with respect to combinations of a plurality of documents, using the tf·idf method (a document vector and a significance of a word included in a document), and at step SD3, each similarity is normalized and converted to an absolute value. Therefore, it is possible to calculate similarities of documents as absolute values with high accuracy, without relying on the document size, and efficiently perform clustering of documents and document extraction.

According to one embodiment, an important sentence allocated with a role is extracted for each of the documents, with the query component extraction processing shown in FIG. 3, and a document formed of this important sentence (see FIG. 11) is made an object of the similarity calculation. As a result, an unnecessary sentence having a noise is cut, thereby the accuracy of similarity as an absolute value can be increased.

One embodiment according to the present invention has been explained in detail with reference to the drawings, but the specific configuration example is not limited to this embodiment, and various design changes are included in the present invention without departing from the scope of the present invention.

For example, in the above-described embodiment, a program for realizing the function of the document extraction apparatus 10 maybe recorded in a computer readable recording medium 200 shown in FIG. 21, and the program recorded in this recording medium 200 may be read by a computer 100 shown in this figure, and executed, to thereby realize each function.

The computer 100 shown in this figure is constituted of a CPU (Central Processing Unit) 110 which executes the program, an input device 120 such as a keyboard and a mouse, a ROM (Read Only Memory) 130 which stores various data, a RAM (Random Access Memory) 140 which stores arithmetic parameters and the like, a reader 150 which reads the program from the recording medium 200, an output device 160 such as a display and a printer, and a bus 170 which connects each section of the devices.

The CPU 110 reads the program stored in the recording medium 200 via the reader 150 and executes the program, to thereby realize the above-described function. The recording medium 200 includes an optical disk, a flexible disk and a hard disk.

According to one aspect of the present invention, a similarity as a relative value between documents is respectively calculated with respect to combinations of a plurality of documents, using a document vector and a significance of a word included in the document and each similarity is converted to an absolute value by normalization. Accordingly, there is the effect that a similarity of documents as an absolute value can be calculated and clustering of documents and document extraction can be performed efficiently, with high accuracy and without relying on the document size.

According to another aspect, in the conversion unit, a sum of a ratio between a similarity having the highest value and a similarity to be converted, and a ratio between a mean value of similarities and the similarity to be converted is used as an absolute value. Accordingly, there is the effect that a similarity of documents as an absolute value can be calculated and clustering of documents and document extraction can be performed efficiently, with high accuracy and without relying on the document size.

According to still another aspect, in the conversion unit, a ratio between a similarity having the highest value among similarities not to be converted and a similarity to be converted is used as an absolute value. Accordingly, there is the effect that a similarity of documents as an absolute value can be calculated and clustering of documents and document extraction can be performed efficiently, with high accuracy and without relying on the document size.

According to still another aspect, a similarity as a relative value between documents is respectively calculated with respect to combinations of a plurality of documents, using a document vector and a significance of a word included in the document, and a plurality of documents is clustered based on a similarity of an absolute value obtained by converting each similarity to an absolute value by normalization. Accordingly, there is the effect that a similarity of documents as an absolute value can be calculated and clustering of documents can be performed efficiently, with high accuracy and without relying on the document size.

According to the still another aspect, an important sentence is extracted from each of the documents, and a document including this important sentence is designated as an object of the similarity calculation. Accordingly, an unnecessary sentence having a noise is cut, and hence there is the effect that the accuracy of similarity as an absolute value can be increased.

According to still another aspect, a similarity as a relative value between documents is respectively calculated with respect to combinations of documents, using a document vector and a significance of a word included in the document, and a plurality of documents is clustered based on a similarity of an absolute value obtained by converting each similarity to an absolute value by normalization, and thereafter, a representative document is selected from sorted each cluster and output. Accordingly, there is the effect that a similarity of documents as an absolute value can be calculated and clustering of documents and representative document extraction can be performed efficiently, with high accuracy and without relying on the document size.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A clustering apparatus comprising:
   a memory; a Central Processing Unit:
   a similarity calculation unit which respectively calculates a similarity as a relative value between documents, with respect to combinations of a plurality of documents, using a document vector and a significance of a word included in a document;
   a conversion unit which converts similarity calculated by the similarity calculation unit to an absolute value by normalization; and
   a clustering unit which executes clustering of a plurality of documents, based on similarity of the absolute value;
   wherein the absolute value is a sum of a ratio between a similarity having a highest value and a similarity to be converted and a ratio between a mean value of similarities and the similarity to be converted, or the absolute value is a ratio between the similarity having the highest value among the similarities not be converted and the similarity to be converted, said normalization being carried out in accordance with a following equation:
   normalized similarity=$\alpha \times$(similarity of target document/similarity of document of first place)+$\beta \times$(similarity of target document/mean value of the similarities), wherein $\alpha$ and $\beta$ are coefficients, and wherein $\alpha$ is 0 and $\beta$ is 1, and a number of higher ranking documents is 1, the above equation can be expressed as following equation:
   Normalized similarity=(similarity of target document/highest similarity in documents other than relevant document), and wherein a result of said normalization identifying at least one of said plurality of documents relative to the relevant document is output.

2. The clustering apparatus according to claim 1, further comprising an important sentence extraction unit which extracts an important sentence from each of the documents, and designates a document consisting of this important sentence as an object of the similarity calculation.

3. A clustering method comprising:
   calculating a similarity as a relative value between documents, with respect to combinations of a plurality of documents, using a document vector and a significance of a word included in a document;
   converting similarity calculated to an absolute value by normalization; and
   executing clustering of a plurality of documents, based on the similarity of the absolute value;
   wherein the absolute value is a sum of a ratio between a similarity having a highest value and a similarity to be converted and a ratio between a mean value of similarities and the similarity to be converted, or the absolute value is a ratio between the similarity having the highest value among similarities not be converted and the similarity to be converted, said normalization being carded out in accordance with a following: normalized similarity=$\alpha \times$(similarity of target document/similarity of document of first place)+$\beta \times$(similarity of target document/mean value of the similarities), wherein $\alpha$ and $\beta$ are coefficients, and wherein $\alpha$ is 0 and $\beta$ is 1, and number of higher ranking documents is 1, the above equation can be expressed as following equation:

Normalized similarity=(similarity of target document/highest similarity in documents other than relevant document), and wherein a result of said normalization identifying at least one of said plurality of documents relative to the relevant document is output.

4. A computer readable recording medium having a program stored therein for causing a computer to execute operations, comprising:

calculating a similarity as a relative value between documents, with respect to combinations of a plurality of documents, using a document vector and a significance of a word included in a document;

converting similarity calculated by the similarity calculated to an absolute value by normalization; and clustering a plurality of documents, based on the similarity of an absolute value;

wherein the absolute value is a sum of a ratio between a similarity having a highest value and a similarity to be converted and a ratio between a mean value of similarities and the similarity to be converted, or the absolute value is a ratio between the similarity having the highest value among the similarities not be converted and similarity to be converted, said normalization being carried out in accordance with a following equation: normalized similarity=$\alpha \times$(similarity of target document/similarity of document of first place)+$\beta \times$(similarity of target document/mean value of the similarities), wherein $\alpha$ and $\beta$ are coefficients, and wherein $\alpha$ is 0 and $\beta$ is 1, and number of higher ranking documents is 1, the above equation can be expressed as following equation:

Normalized similarity=(similarity of target document/highest similarity in documents other than relevant document), and wherein a result of said normalization identifying at least one of said plurality of documents relative to the relevant document is output.

5. A document extraction apparatus comprising:

a memory; a Central Processing Unit:

a similarity calculation unit which respectively calculates a similarity as a relative value between documents, with respect to combinations of a plurality of documents, using a document vector and a significance of a word included in a document;

a conversion unit which converts a similarity calculated by the similarity calculation unit to an absolute value by normalization;

a clustering unit which performs clustering of a plurality of documents, based on the similarity of the absolute value;

a cluster sort unit which sorts results of the clustering, using number of documents constituting each cluster as a key;

a representative document selection unit which selects a representative document from each cluster, with respect to the sorted results; and an output unit which outputs representative documents in order corresponding to the sorted results;

wherein the absolute value is a sum of a ratio between a similarity having a highest value and a similarity to be converted and a ratio between a mean value of similarities and the similarity to be converted, or the absolute value is a ratio between the similarity having the highest value among similarities not be converted and the similarity to be converted, said normalization being carried out in accordance with a following equation:

normalized similarity=$\alpha \times$(similarity of target document/similarity of document of first place)+$\beta \times$(similarity of target document/mean value of the similarities), wherein $\alpha$ and $\beta$ are coefficients, and wherein $\alpha$ is 0 and $\beta$ is 1, and number of higher ranking documents is 1, the above equation can be expressed as following equation:

Normalized similarity=(similarity of target document/highest similarity in documents other than relevant document), and wherein a result of said normalization identifying at least one of said plurality of documents relative to the relevant document is output.

6. A document extraction method comprising:

calculating a similarity as a relative value between documents, with respect to combinations of a plurality of documents, using a document vector and a significance of a word included in a document;

converting similarity calculated to an absolute value by normalization;

clustering of a plurality of documents, based on the similarity of an absolute value;

sorting results of clustering, using number of documents constituting each cluster as a key;

selecting a representative document from each cluster, with respect to the sorted results; and outputting representative documents in order corresponding to the sorted results;

wherein the absolute value is a sum of a ratio between a similarity having a highest value and a similarity to be converted and a ratio between a mean value of similarities and the similarity to be converted, or the absolute value is a ratio between the similarity having the highest value among similarities not be converted and the similarity to be converted, said normalization being carried out in accordance with a following equation:

normalized similarity=$\alpha \times$(similarity of target document/similarity of document of first place)+$\beta \times$(similarity of target document/mean value of the similarities), wherein $\alpha$ and $\beta$ are coefficients, and wherein $\alpha$ is 0 and $\beta$ is 1, and number of higher ranking documents is 1, the above equation can be expressed as following equation:

Normalized similarity=(similarity of target document/highest similarity in documents other than relevant document), and wherein a result of said normalization identifying at least one of said plurality of documents relative to the relevant document is output.

7. A computer readable recording medium having a program stored therein for causing a computer to operations, comprising:

calculating a similarity as a relative value between documents, with respect to combinations of a plurality of documents, using a document vector and a significance of a word included in a document;

converting similarity calculated by the similarity calculated to an absolute value by normalization; and clustering of a plurality of documents, based on the similarity of the absolute value;

sorting results of the clustering, using number of documents constituting each cluster as a key;

selecting a representative document from each cluster, with respect to the sorted results; and outputting representative documents in order corresponding to the sorted results;

wherein the absolute value is a sum of a ratio between a similarity having a highest value and a similarity to be converted and a ratio between a mean value of similarities and the similarity to be converted, or the absolute value is a ratio between the similarity having the highest value among similarities not be converted and the similarity to be converted, said normalization being carried out in accordance with a following equation:

normalized similarity=$\alpha$×(similarity of target document/similarity of document of first place)+$\beta$×(similarity of target document/mean value of the similarities), wherein $\alpha$ and $\beta$ are coefficients, and wherein $\alpha$ is 0 and $\beta$ is 1, and number of higher ranking documents is 1, the above equation can be expressed as a following equation:

Normalized similarity=(similarity of target document/highest similarity in documents other than relevant document), and wherein a result of said normalization identifying at least one of said plurality of documents relative to the relevant document is output.

* * * * *

UNITED STATES PATENT AND TRADEMARK OFFICE
CERTIFICATE OF CORRECTION

PATENT NO. : 7,451,139 B2
APPLICATION NO. : 10/281318
DATED : November 11, 2008
INVENTOR(S) : Isao Namba It is certified that error appears in the above-identified patent and that said Letters Patent is hereby corrected as shown below:

Column 10, Lines 61-67, after "following:" insert a new line starting with --normalized--.

Column 11, Lines 25-28, after "a following equation:" insert a new line starting with --normalized--.

Column 12, Line 47, change "operations," to --execute operations,--.

Signed and Sealed this

Seventeenth Day of February, 2009

JOHN DOLL
*Acting Director of the United States Patent and Trademark Office*